(12) United States Patent
Wescott et al.

(10) Patent No.: US 10,427,247 B2
(45) Date of Patent: Oct. 1, 2019

(54) ADDITIVE LAYER MANUFACTURING

(71) Applicant: BAE SYSTEMS plc, London (GB)

(72) Inventors: Andrew David Wescott, Bristol (GB); Jagjit Sidhu, Bristol (GB)

(73) Assignee: BAE SYSTEMS plc, London (GB)

( * ) Notice: Subject to any disclaimer, the term of this patent is extended or adjusted under 35 U.S.C. 154(b) by 531 days.

(21) Appl. No.: 14/386,277

(22) PCT Filed: Mar. 18, 2013

(86) PCT No.: PCT/GB2013/050688
§ 371 (c)(1),
(2) Date: Sep. 18, 2014

(87) PCT Pub. No.: WO2013/140147
PCT Pub. Date: Sep. 26, 2013

(65) Prior Publication Data
US 2015/0041025 A1    Feb. 12, 2015

(30) Foreign Application Priority Data
Mar. 19, 2012   (GB) .................................. 1204752.8

(51) Int. Cl.
*B23K 26/356*     (2014.01)
*B33Y 10/00*      (2015.01)
(Continued)

(52) U.S. Cl.
CPC .......... *B23K 26/356* (2015.10); *B22F 3/1055* (2013.01); *B23K 9/042* (2013.01);
(Continued)

(58) Field of Classification Search
CPC ........ B23K 26/356; B33Y 10/00; B33Y 30/00
(Continued)

(56) References Cited

U.S. PATENT DOCUMENTS

| | | | | |
|---|---|---|---|---|
| 3,985,995 A | * | 10/1976 | Brandi ................... | B23K 9/048 219/76.11 |
| 5,296,675 A | * | 3/1994 | Gilman ................... | B23K 9/167 219/128 |
| 5,301,863 A | * | 4/1994 | Prinz ....................... | B22F 3/008 156/59 |
| 5,674,329 A | * | 10/1997 | Mannava ............... | C21D 10/005 148/525 |

(Continued)

FOREIGN PATENT DOCUMENTS

| | | |
|---|---|---|
| DE | 102009051551 | 5/2011 |
| EP | 0529816 A1 | 3/1993 |

(Continued)

OTHER PUBLICATIONS

International Search Report and Written Opinion of the International Searching Authority received for Patent Application No. PCT/GB2013/050688, dated Aug. 5, 2013, 11 pages.

(Continued)

*Primary Examiner* — Ibrahime A Abraham
*Assistant Examiner* — Spencer H. Kirkwood
(74) *Attorney, Agent, or Firm* — Finch & Maloney PLLC

(57) ABSTRACT

Apparatus and a method for forming a metallic component by additive layer manufacturing are provided. The method includes the steps of using a heat source such as a laser to melt the surface of a work piece and form a weld pool; adding wire or powdered metallic material to the weld pool and moving the heat source relative to the work piece so as to progressively form a new layer of metallic material on the work piece; applying forced cooling to the formed layer; stress relieving the cooled layer by applying a peening step, for example with a pulsed laser, and repeating the above steps as required to form the component layer by layer.

16 Claims, 3 Drawing Sheets

(51) Int. Cl.
| | |
|---|---|
| *B33Y 30/00* | (2015.01) |
| *B23K 9/04* | (2006.01) |
| *B22F 3/105* | (2006.01) |
| *B23K 35/02* | (2006.01) |
| *B23K 31/00* | (2006.01) |
| *C21D 10/00* | (2006.01) |
| *B23K 26/32* | (2014.01) |
| *B23K 26/342* | (2014.01) |
| *B23K 26/144* | (2014.01) |
| *B23K 26/70* | (2014.01) |
| *B23K 26/0622* | (2014.01) |
| *B29C 64/153* | (2017.01) |
| *B23K 103/00* | (2006.01) |

(52) U.S. Cl.
CPC ........ *B23K 26/0622* (2015.10); *B23K 26/144* (2015.10); *B23K 26/32* (2013.01); *B23K 26/342* (2015.10); *B23K 26/703* (2015.10); *B23K 31/003* (2013.01); *B23K 35/0244* (2013.01); *B23K 35/0261* (2013.01); *B29C 64/153* (2017.08); *B33Y 10/00* (2014.12); *B33Y 30/00* (2014.12); *C21D 10/005* (2013.01); *B22F 2003/1056* (2013.01); *B22F 2999/00* (2013.01); *B23K 2103/50* (2018.08); *C21D 2251/00* (2013.01); *Y02P 10/295* (2015.11)

(58) Field of Classification Search
USPC .................................................... 219/121.65
See application file for complete search history.

(56) References Cited

U.S. PATENT DOCUMENTS

| | | | |
|---|---|---|---|
| 5,746,844 A | 5/1998 | Sterett et al. | |
| 6,593,540 B1 * | 7/2003 | Baker | B23K 26/0096 219/121.63 |
| 6,843,957 B2 | 1/2005 | Statnikov | |
| 7,286,893 B1 | 10/2007 | Mazumder | |
| 2005/0263934 A1 * | 12/2005 | Chung | B29C 64/153 264/113 |
| 2009/0014422 A1 * | 1/2009 | Miklos | B23K 5/213 219/75 |
| 2009/0084767 A1 * | 4/2009 | Deaton, Jr. | B23K 26/0069 219/121.83 |

FOREIGN PATENT DOCUMENTS

| | | |
|---|---|---|
| JP | 6326280 A | 2/1988 |
| WO | 2010125381 A1 | 11/2010 |
| WO | 2013140147 A1 | 9/2013 |

OTHER PUBLICATIONS

GB Intellectual Property Office Search Report under Section 17(5) received for GB Patent Application No. 1204752.8, dated Jul. 19, 2012, 3 pages.
GB Intellectual Property Office Search Report under Section 17(5) received for GB Patent Application No. 1304915.0, dated Aug. 2, 2013, 3 pages.
International Preliminary Report on Patentability received for Patent Application No. PCT/GB2013/050688, dated Oct. 2, 2014, 8 pages.

* cited by examiner

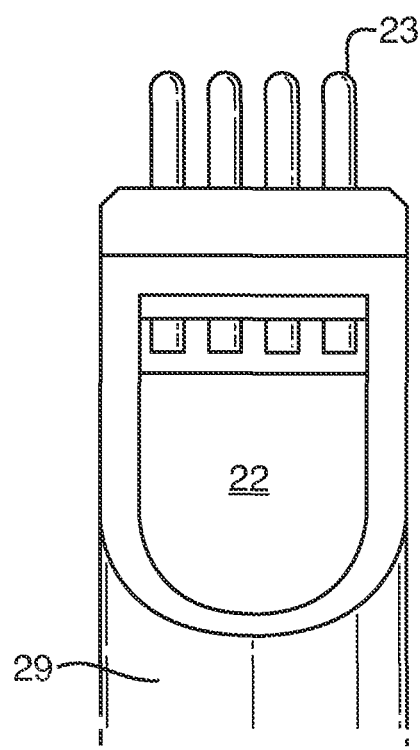

No Treatment

Treatment Every 5 Layers

Treatment Every Layer

No Treatment

Treatment Every 5 Layers

Treatment Every Layer

No Treatment

Treatment Every 5 Layers

Treatment Every Layer

ADDITIVE LAYER MANUFACTURING

This invention relates to additive layer manufacturing (ALM) and in particular to apparatus and a method to relieve stress in a component manufactured by an ALM process.

ALM is a relatively new consolidation process that is able to produce a functional complex part, layer by layer, without moulds or dies. This process uses a powerful heat source such as a laser beam or a welding arc to melt a controlled amount of metal in the form of metallic powder or wire, which is then deposited, initially, on a base plate. Subsequent layers are then built up upon each preceding layer. As opposed to conventional machining processes, this computer-aided manufacturing (CAM) technology builds complete functional parts or, alternatively, builds features on existing components, by adding material rather than by removing it.

Currently known ALM manufacturing techniques include: Laser Blown Powder, Laser Powder Bed, and Wire and Arc technologies. Laser Blown Powder technology will be focused upon, here, but broad details of Laser Powder Bed and Wire and Arc technologies are as follows.

Laser Powder Bed technology uses a laser to melt metallic powder contained in a powder bed. The work piece is mounted within the powder bed and the surface of the powder is levelled off so as to just cover the surface of the work piece. The laser is then scanned over the work piece along a path which defines the shape of the component to be manufactured. Powder is melted to this shape and solidifies to a layer of metal on the work piece in the desired shape. The powder is then re-levelled, slightly higher, and the process is repeated until the component has been fully formed.

Wire and Arc technology, instead of using a laser as a heat source and metallic powder as the incremental material, uses a known welding arc to melt additive layer material in the form of a wire. The process is carried out on a similar scale to conventional welding but with many more "passes" being used to construct the component.

In the Laser Blown Powder process, during deposition of the initial layer(s), the laser beam is directed at a piece of starting material or "parent plate" to create a weld pool in the parent plate to which the powder is added. The powder is carried to the focal point of the laser in a precisely directed carrier gas such as Argon.

It is a problem with this type of manufacturing that, during weld pool creation, the work piece is subject to intense localised heating. This heating creates steep thermal gradients in the work piece between the molten material in the weld pool and cold material which surrounds it. If transverse compressive stresses in the work piece, which are caused by very hot expanding material, exceed the yield point of the material then compressive plastic yielding (CPY) will occur in the material surrounding the weld. On cooling and shrinkage of the work piece, high tensile residual transverse stresses will be created across the weld and these will be balanced by residual compressive stresses further away from the weld. It is these residual compressive stresses which cause buckling distortion when they exceed a critical buckling load (CBL) for the parent material of the work piece. This is a particular difficulty when working with thin section material.

During cooling of the work piece, the solidification rate of the material is a determining factor for the final microstructure. The microstructure of the material plays an essential role in controlling mechanical properties. Microstructure morphologies which have been observed with prior art ALM methods commonly show large columnar grains growing vertically from bottom to top of the work piece build. This type of grain structure produces mechanical properties which are unfavourable compared to fine grained equi-axed structures and those of wrought material.

It is accordingly an aim of the present invention to overcome at least some of the difficulties with prior art ALM methods.

According to a first aspect of the present invention, there is provided a method of forming a metallic component by additive layer manufacturing including the steps of a) using a heat source to apply heat to a portion of a surface of a work piece sufficient to melt said portion; b) adding metallic material to the melted portion and moving the heat source relative to the work piece whereby progressively to form a layer of metallic material on the work piece; c) applying forced cooling to the formed layer to bring the layer to a state of crystallisation; d) stress relieving the cooled layer, and repeating steps a) to d) as required whereby to form the component.

The invention provides a method of mitigating distortion for each layer during the building of additive layer manufactured parts. Not only is distortion controlled but the internal microstructure of the final part can be refined, thereby improving mechanical properties.

The additive manufacturing method may be selected from the group: laser blown powder manufacture; laser powder bed manufacture, and wire and arc manufacture.

The step of stress relieving the layer may comprise applying high frequency peening to the layer which may be in the form of applying pulsed laser treatment or ultra-sonic impact treatment to a surface of the layer.

The step of applying pulsed laser treatment to the surface of the layer may include the step of applying a covering to the surface whereby to focus a shock wave generated by each laser pulse into the layer. The covering may be a sacrificial layer such as a coating or tape and/or a liquid covering.

According to a second aspect of the invention there is provided additive layer manufacturing apparatus for manufacturing a metallic component, the apparatus including a treatment station and means to move the treatment station relative to a work piece, the treatment station including a heat source, a source of metallic material, cooling means and stress relieving means, the heat source being sufficient to melt a portion of a surface of the work piece together with metallic material being fed into the heat source whereby to form an added layer of metallic material on the work piece, the cooling means being adapted to cool the added layer to a crystallised state, the stress relieving means being adapted to relieve stress in the added layer.

The stress relieving means may be adapted to be applied specifically to the added layer and may thus modify the microstructure of the added layer.

The stress relieving means may thus comprise a pulsed laser whereby to apply laser peening to the added layer or may comprise ultrasonic impact treatment (UIT) means. Both these treatments apply small amounts of force at high frequency to the work piece surface whereby to work harden the applied layer of metallic material.

Where a pulsed laser is used to achieve the stress relief, the apparatus may include means to assist focus of each laser pulse into the cooled added layer. Such means may deposit a sacrificial covering upon the cooled layer and may be adapted to deposit a layer of paint or tape and/or a liquid layer.

The heat source may be a laser focused upon the work piece surface and the source of metallic material may be a powder and gas delivery device adapted to deliver gas carrying the metal powder substantially to the focal point of the laser.

Alternatively, the heat source may be a laser focused upon the work piece surface and the source of metallic material may be a powder bed in which the work piece is positioned and wherein the bed is filled with metallic powder substantially to a level of the work piece surface.

As a further alternative, the heat source may be a welding arc and the source of metallic material may be a metallic wire held on feed means, the arc being positioned whereby to create a weld pool on the surface of the work piece and the feed means being adapted to feed the wire to the weld pool.

The cooling means may be forced gas cooling means or water spray means and may advantageously be a cryogenic cooling means.

The invention will now be described by way of example with reference to the accompanying drawings of which:

FIG. 3 is a side view of part of a sonotrode head for UIT apparatus for use according to the invention;

Figure 1:
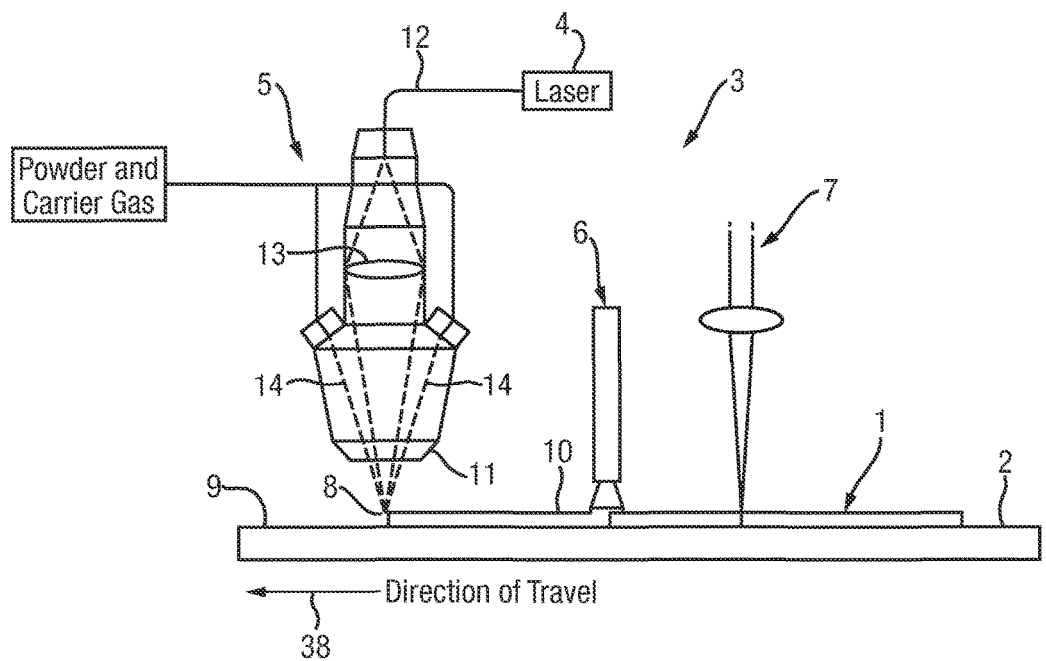
FIG. 1 is a schematic view of apparatus according to the invention.

Referring to FIG. 1, apparatus according to the invention is shown in operation on a work piece 1. The apparatus comprises a bed (not shown) supporting a parent plate 2 of the work piece 1 and a treatment station 3, movable with respect to the work piece 1 and bed. The treatment station is made up of a heat source in the form of a high powered laser 4, a source of metallic material in the form of a powder delivery system 5, cooling means in the form of a forced cooling nozzle 6 and stress relieving means in the form of a high frequency pulsed laser 7. Equally, the stress relieving means 7 could be in another form, such as UIT apparatus. Indeed, UIT could often be preferred, owing to its potential to penetrate the ALM structure to a greater depth than laser peening.

The laser 4 is focused upon a focal point 8 on an upper surface 9 of the work piece 1, whereby to melt the surface 9 to form a weld pool. The laser 4 is controlled by a computer (not shown) to deliver a laser beam via an optical fibre 12 to conventional focussing optics 13 which focus the laser beam to the focal point 8 on the surface 9 of the work piece.

The powder delivery system 5 delivers powder to the vicinity of the laser focal point 8. Thus, the powder is sintered as it is deposited on the work piece surface to form a layer or bead 10. In the present embodiment, the powder is stainless steel 316 powder, obtained from the company Höganäs (Great Britain) Ltd, having a place of business at Munday Works, 58/66 Morley Road, Tonbridge, Kent, United Kingdom. The powder grains have a diameter between 36 µm and 106 µm. Powder delivery system 5 delivers powder at a rate of three grams per minute through a deposition nozzle 11, along three delivery lines 14 disposed symmetrically around the deposition nozzle 11.

The laser apparatus 4, 13 is mounted so as to be moveable under the control of the computer in the X-Y plane parallel to the parent plate surface, and vertically in the Z direction orthogonal to it. The laser focal point 8 thus can be directed to any point in a working envelope in the X-Y plane and vertically so as to accommodate both work pieces of different height and also regions of different height within work pieces. As illustrated in the figure, the traverse direction is in the direction of arrow 38.

The laser 4 is an Nd:YAG laser operating at a wavelength of 1064 nm, and having a continuous wave power output of 500 w.

The bead is cooled to a crystallised state using the forced cooling gas nozzle 6. This may use air or a cryogenic spray jet, for example.

The cooled bead is then treated with the high frequency pulsed laser 7 to reduce residual stress and modify the microstructure. Many beads may be laid down beside one another and built on top of each other to form simple or complex parts and each bead may have residual stress and distortion minimised, by the laser treatment, with the formation of improved microstructure.

The pulsed laser treatment is an on-line process and has the effect of micro work hardening the metal, hence reducing residual stress and distortion within each individually deposited bead. With the pulsed laser treatment, or laser peening as it is also known, each laser pulse fired at the surface of the bead vaporises a small volume of surface material (which may include the sacrificial layer or liquid covering if used). The high pressure plasma thus generated imparts a shock wave through the material of the bead, currently to a depth of a few hundred microns. The use of the sacrificial layer and/or the liquid can increase this effect up to a depth of a few millimeters. The depth of laser treatment will depend, in addition, on the amount of plasma generated by each pulse which in turn will depend upon the laser pulse energy, duration and frequency.

It is understood that the mechanism for micro work hardening by laser treatment occurs firstly by the movement of dislocations within the material to grain boundaries. The addition of each subsequent layer applies heat to the preceding layer and the dislocations act as nucleation sites for grain re-growth. The size and number of new grains is controlled by the amount of laser treatment carried out.

It is necessary that the deposited bead should be in a cooled, crystallised, state for the process to be successful. It is suggested that the laser treatment will be effective for a depth up to approximately 500 microns. This is consistent with the thickness of deposited material laid down by this ALM method.

This method of residual stress and microstructure control is novel in that it addresses the issues of distortion and mechanical property improvements at the time of deposition. Currently, methods to mitigate distortion include heat treatments, stress engineering methods, optimised sequencing or artificial aging of the entire part, all carried out as a post weld process. This integrated method operates as an on-line, in-situ process negating the need for costly post processing.

An alternative method of stress relief would be to replace the laser treatment with UIT. This will have a similar effect to the pulsed laser treatment and indeed may be effective to greater material depths.

UIT equipment consists of a generator and a hand held tool having a peening head with one or more free floating needles. UIT works by converting harmonic resonations of an acoustically tuned body energised by an ultrasonic transducer into mechanical impulses imparted into the surface of the material being treated by the needles of the tool.

The ultrasonic frequency may be between 15 and 55 kHz, being 27 kHz on the E-sonix PLC07 equipment used, and the vibration amplitude of the needles of the tool may be set-up from 10 μm to 250 μm (peak to peak), being 26 μm on the equipment used. A pin arrangement of four rounded pins in a row, of 3.5 mm diameter and 6 mm pitch was used. In some circumstances an overlapping array of pins may be preferred.

UIT is traditionally carried out on the toes of welds where it modifies the toe shape, reducing the acuity of the mechanical notch. The UIT tool creates a zone of residual compressive stress at the surface, where stress concentration for tensile loads is greatest. In the present invention the UIT is usually carried out over the whole surface of the most recently deposited layer of material of the work piece. However, if the ALM structure of the work piece being built up is to be tailored in its properties, the application of UIT to the work piece during build may be varied. For example, only parts of the layers may be treated or treatment may be applied to selected layers only, depending on the stiffness or strength required, for different parts of the work piece. Such variations in the treatment throughout the work piece structure may be carried out in conjunction with variations in the deposited material, throughout the structure of the work piece.

It will be appreciated that such treatment variations may equally be carried out, whatever form of stress relief is being applied.

With the equipment used, plastic deformation of the work piece to a depth of between 100 and 200 μm was achieved on an ALM build layer thickness of 500 to 1000 μm, with a work piece geometry of 15 mm width, 200 mm length and 60 mm height. Materials used were stainless steel 316L and titanium 6Al4V.

Grain refinement and grain size reduction are achieved, using UIT.

Figure 2:
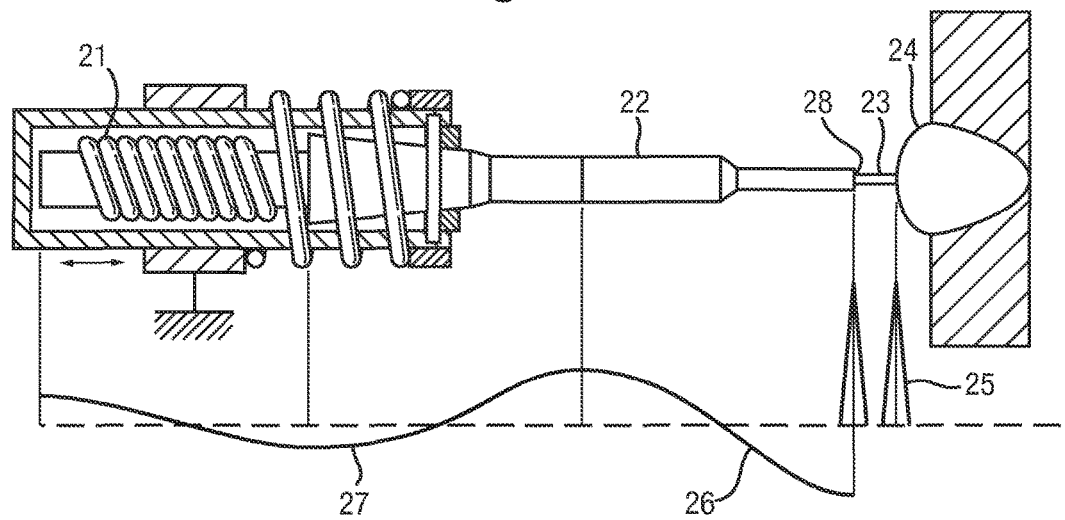
FIG. 2 is a schematic view of UIT apparatus for use according to the invention.

FIG. 2 of the drawings shows a schematic side view of a conventional hand-held tool for use in UIT. A magnetorestrictive transducer 21 provides an ultrasonic signal which is passed to a waveguide 22. Slidably in contact with the waveguide 22 at a distal end 28 thereof are four pins 23. A pin holder 29 (see FIG. 3) is firmly attached to the waveguide 22. The pins are slidably mounted in the pin holder 29 and arranged to be driven toward a work piece 24 by each pulse of the waveguide. The transition from sinusoidal waveform 27 to pulse waveform 25 is shown in the drawing. In FIG. 2 the work piece 24 is shown as a weld. However, in use according to the invention, the tool is mounted to the treatment station 3 (see FIG. 1) for the pins 23 to engage the layer 10 of the work piece to apply stress relief thereto.

The carrying out of UIT on the uppermost layer of the work piece, according to the invention during build, will alleviate stress build up in the component and help to prevent distortion thereof.

Figure 4A:
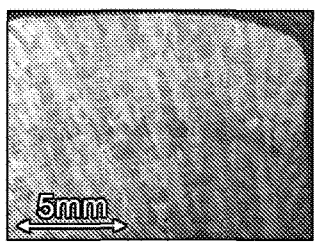
FIGS. 4a, 4b and 4c are a series of micrographs for an ALM structure receiving no stress relief.
Figure 5A:
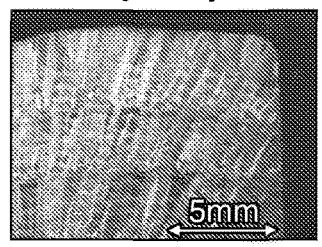
FIGS. 5a, 5b and 5c are a series of micrographs for an ALM structure receiving stress relief according to the invention, for every fifth layer deposited.
Figure 6A:
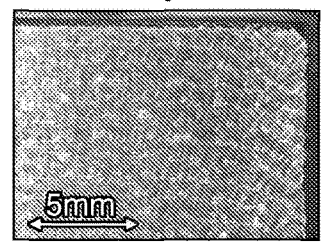
FIGS. 6a, 6b and 6c are a series of micrographs for an ALM structure receiving stress relief according to the invention, for every layer deposited.
Figure 4B:
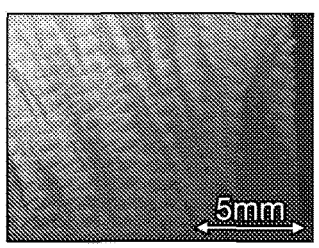
Figure 5B:
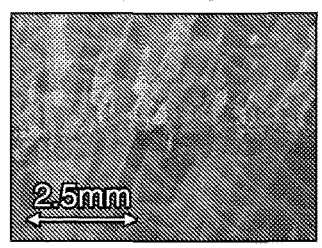
Figure 6B:
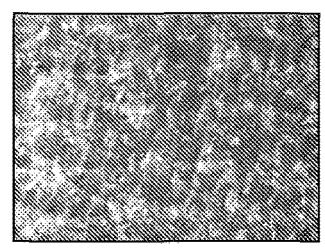
Figure 4C:
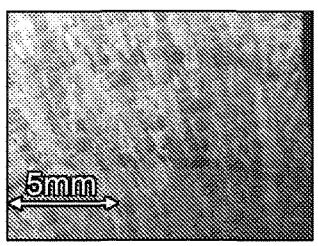
Figure 5C:
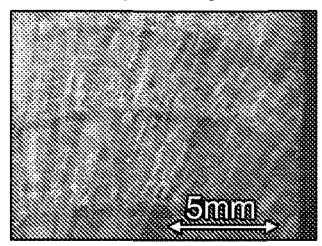
Figure 6C:
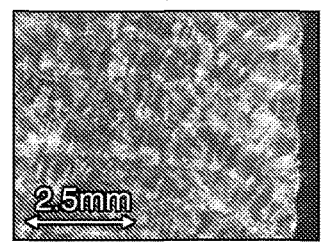

FIGS. 4, 5 and 6 are micrographs showing the effect of stress relieving the ALM structure of the work piece, according to the invention. FIG. 4 shows grain structure at three locations in the work piece where no stress relief has been carried out. Long columnar grains can clearly be seen. FIG. 4a shows an upper surface of the work piece and FIGS. 4b and 4c show other locations lower down in the work piece.

FIG. 5 shows grain structure of a work piece which has had UIT applied to every fifth layer of material. Curved lines across the grain structure can clearly be seen where UIT has been applied. Finer grain structure resulting from the treatment is apparent in al three figures, FIGS. 5a, 5b and 5c.

FIG. 6 shows grain structure of a work piece which has had UIT applied to every layer. An even finer grain structure is apparent here in all three figures.

The invention claimed is:

1. A method of forming a metallic component by additive layer manufacturing, the method comprising:
   using a heat source at a treatment station to apply heat to a portion of a surface of a work piece in situ, the heat being sufficient to melt said portion of the surface, the heat source being movable relative to the work piece;
   adding metallic material to the melted portion in situ using a source of metallic material at the treatment station, the source of metallic material being movable relative to the work piece, and moving the heat source relative to the work piece so as to progressively form a layer of metallic material on the work piece;
   applying forced gas cooling to the added layer in situ using a cooling source at the treatment station, the application of the forced gas cooling being at the time of deposition of the added layer onto another portion of the surface of the work piece, the cooling source being movable relative to the work piece, and moving the cooling source relative to the work piece so as to bring the added layer to a state of crystallisation;
   depositing a sacrificial covering upon the cooled added layer, the depositing being at the time of deposition of the added layer to another portion of the surface of the work piece;
   stress relieving the cooled added layer in situ using a pulsed laser treatment on the sacrificial covering at the treatment station, stress relief of the cooled added layer being at the time of deposition of the added layer onto another portion of the surface of the work piece, the pulsed laser treatment being movable relative to the work piece, and moving the pulsed laser treatment relative to the work piece so as to relieve stress in the cooled added layer; and
   repeating the using, adding, applying, and stress relieving as required to form the component.

2. The method as in claim 1, wherein the additive layer manufacturing method is at least one of: laser blown powder manufacture, laser powder bed manufacture, and wire and arc manufacture.

3. The method as in claim 1, wherein the stress relieving comprises applying high frequency peening to the cooled layer.

4. An additive layer manufacturing apparatus for manufacturing a metallic component, the apparatus comprising:
   a treatment station that is movable relative to a work piece, the treatment station including a heat source movable relative to the work piece, a source of metallic material movable relative to the work piece, a sacrificial deposition source, a cooling source movable relative to the work piece, and a stress reliever movable relative to the work piece;
   the heat source configured to melt a portion of a surface of the work piece in situ together with metallic material being fed into the heat source to form an added layer of metallic material on the work piece at the treatment station as the treatment station moves relative to the work piece;
   the cooling source configured to apply forced gas cooling to the added layer in situ to cool the added layer to a state of crystallisation at the treatment station as the treatment station moves relative to the work piece, wherein the cooling source is configured to apply forced gas cooling to a first section of the added layer simultaneously with the heat source causing formation of the added layer of metallic material on a second section of the work piece;

the sacrificial deposition source configured to deposit a sacrificial covering upon the cooled added layer, wherein the sacrificial deposition source is configured to deposit the sacrificial covering upon a third portion of the cooled added layer simultaneously with the heat source causing formation of the added layer of metallic material on the second section of the work piece; and the stress reliever configured to provide pulsed laser treatment to the sacrificial covering in situ so as to relieve stress in the added layer at the treatment station as the treatment station moves relative to the work piece, stress relief of the cooled added layer being at the time of deposition of another added layer onto the portion of the surface of the work piece.

5. The apparatus as in claim 4, wherein the stress reliever is configured to be applied specifically to the cooled added layer so as to modify the microstructure of the added layer.

6. The apparatus as in claim 4, wherein the heat source comprises a laser configured to be focused upon the work piece surface, wherein the source of metallic material comprises a powder, and wherein a gas delivery device is configured to deliver gas carrying the metal powder substantially to the focal point of the laser.

7. The apparatus as in claim 4, wherein the heat source comprises a laser configured to be focused upon the work piece surface, wherein the source of metallic material comprises a powder bed in which the work piece is to be positioned, and wherein the bed is configured to be filled with metallic powder substantially to a level of the work piece surface.

8. The apparatus as in claim 4, wherein the heat source comprises a welding arc, and wherein the source of metallic material comprises a metallic wire held on a feed, the welding arc being positioned so as to create a weld pool on the surface of the work piece and the feed being configured to feed the wire to the weld pool.

9. The apparatus as in claim 4, wherein the cooling source comprises cryogenic cooling.

10. The apparatus as in claim 4, wherein the sacrificial deposition source includes an applicator to deposit the sacrificial covering upon the cooled added layer.

11. The method as in claim 1, wherein the method is computer-aided.

12. The apparatus as in claim 4, wherein the heat source comprises a laser configured to be focused upon the work piece surface, and wherein the source of metallic material comprises a powder bed in which the work piece is to be positioned.

13. An additive layer manufacturing apparatus for manufacturing a metallic component, the apparatus comprising:

a treatment station that is movable relative to a work piece, the treatment station including a heat source movable relative to the work piece, a source of metallic material movable relative to the work piece, a sacrificial deposition source, a cooling source movable relative to the work piece, and a stress reliever movable relative to the work piece, the heat source comprising a laser configured to be focused upon the work piece surface, or a welding arc positioned so as to create a weld pool on the work piece surface, the heat source configured to melt a portion of a surface of the work piece in situ together with metallic material being fed into the heat source to form an added layer of metallic material on the work piece at the treatment station as the treatment station moves relative to the work piece, the cooling source configured to apply forced gas cooling to the added layer in situ to cool the added layer to a state of crystallisation at the treatment station as the treatment station moves relative to the work piece, the sacrificial deposition source configured to deposit a sacrificial covering upon the cooled added layer, and the stress reliever configured to provide pulsed laser treatment to the sacrificial covering in situ so as to relieve stress in the added layer at the treatment station as the treatment station moves relative to the work piece, wherein the heat source is configured to, during a first time period, melt the portion of the surface of a first portion of the work piece in situ together with metallic material being fed into the heat source, wherein the cooling source is configured to, during the first time period, apply the forced gas cooling to a second portion of the added layer, wherein the sacrificial deposition source is configured to, during the first time period, deposit the sacrificial covering upon a third portion of the cooled added layer, wherein the stress reliever is configured to, during the first time period, provide pulsed laser treatment to a fourth portion of the sacrificial covering, and wherein the source of metallic material comprises a powder and gas delivery device configured to deliver gas carrying the metal powder substantially to the focal point of the laser, or a powder bed in which the work piece is to be positioned, or a metallic wire feed, the feed being adapted to feed the wire to the weld pool.

14. The apparatus as in claim 13, wherein the sacrificial deposition source includes an applicator to deposit the sacrificial covering upon the cooled added layer.

15. The apparatus as in claim 10, wherein the sacrificial covering includes at least one of a coating and a tape.

16. The apparatus as in claim 10, wherein the sacrificial covering includes a liquid.

* * * * *